US009487174B2

(12) United States Patent
Szewczyk et al.

(10) Patent No.: US 9,487,174 B2
(45) Date of Patent: Nov. 8, 2016

(54) PERSONAL RESTRAINT SYSTEM WITH PULL-CORD RELEASABLE SAFETY NET

(71) Applicant: Shield Restraint Systems, Inc., Elkhart, IN (US)

(72) Inventors: Alexander J. Szewczyk, Elkhart, IN (US); Brandon Marriott, Goshen, IN (US)

(73) Assignee: Shield Restraint Systems, Inc., Elkhart, IN (US)

( * ) Notice: Subject to any disclaimer, the term of this patent is extended or adjusted under 35 U.S.C. 154(b) by 0 days.

(21) Appl. No.: 14/312,378

(22) Filed: Jun. 23, 2014

(65) Prior Publication Data

US 2015/0021955 A1    Jan. 22, 2015

Related U.S. Application Data

(60) Provisional application No. 61/856,640, filed on Jul. 19, 2013.

(51) Int. Cl.
| | |
|---|---|
| *B60R 21/06* | (2006.01) |
| *B60J 5/04* | (2006.01) |
| *E05B 85/00* | (2014.01) |
| *E05B 85/04* | (2014.01) |
| *B60R 21/02* | (2006.01) |
| *E05B 63/00* | (2006.01) |

(52) U.S. Cl.
CPC .............. *B60R 21/06* (2013.01); *B60J 5/0487* (2013.01); *E05B 85/00* (2013.01); *E05B 85/04* (2013.01); *B60R 2021/028* (2013.01); *E05B 2063/0026* (2013.01); *Y10T 292/08* (2015.04)

(58) Field of Classification Search
CPC .......... B60J 1/085; B60J 5/04; B60J 5/0468; B60J 5/048; B60J 5/0486; B60J 5/0487; B60J 5/06; B60J 11/06; B60R 21/02; B60R 21/06; E05B 85/00
USPC ........... 296/146.5, 146.13, 147, 148, 190.03, 296/190.11; 280/749
See application file for complete search history.

(56) References Cited

U.S. PATENT DOCUMENTS

| | | | | |
|---|---|---|---|---|
| 3,011,820 | A * | 12/1961 | Frieder et al. .................. | 294/77 |
| 6,487,761 | B2 * | 12/2002 | Van Tassel ...................... | 24/606 |
| 7,828,180 | B2 * | 11/2010 | Slesar ........................ | A45F 5/02 |
| | | | | 119/776 |
| 8,714,591 | B1 * | 5/2014 | Kobayashi et al. ........... | 280/749 |
| 2009/0243339 | A1 * | 10/2009 | Orr et al. ................. | 296/190.03 |
| 2012/0032431 | A1 * | 2/2012 | King ........................ | 280/756 |
| 2013/0087394 | A1 * | 4/2013 | Sanschagrin et al. ........ | 180/54.1 |
| 2014/0306487 | A1 * | 10/2014 | Dobrot et al. ........... | 296/190.03 |

* cited by examiner

*Primary Examiner* — Jason S Daniels
(74) *Attorney, Agent, or Firm* — Perkins Coie LLP

(57) ABSTRACT

Personal restraint systems having releasable safety nets are disclosed herein. A personal restraint system configured in accordance with one embodiment of the present technology includes a safety net configured to extend across a portion of an opening in a vehicle adjacent to an operator seating portion. The restraint system can further include a latch device configured to releasably couple the safety net to an anchor point adjacent to the opening. In some embodiments, a pull cord is operably coupled to the latch device and slidably coupled to the safety net. The pull cord is configured to be pulled by an operator to release the latch device from the anchor point and allow the safety net to fall free of the opening.

29 Claims, 8 Drawing Sheets

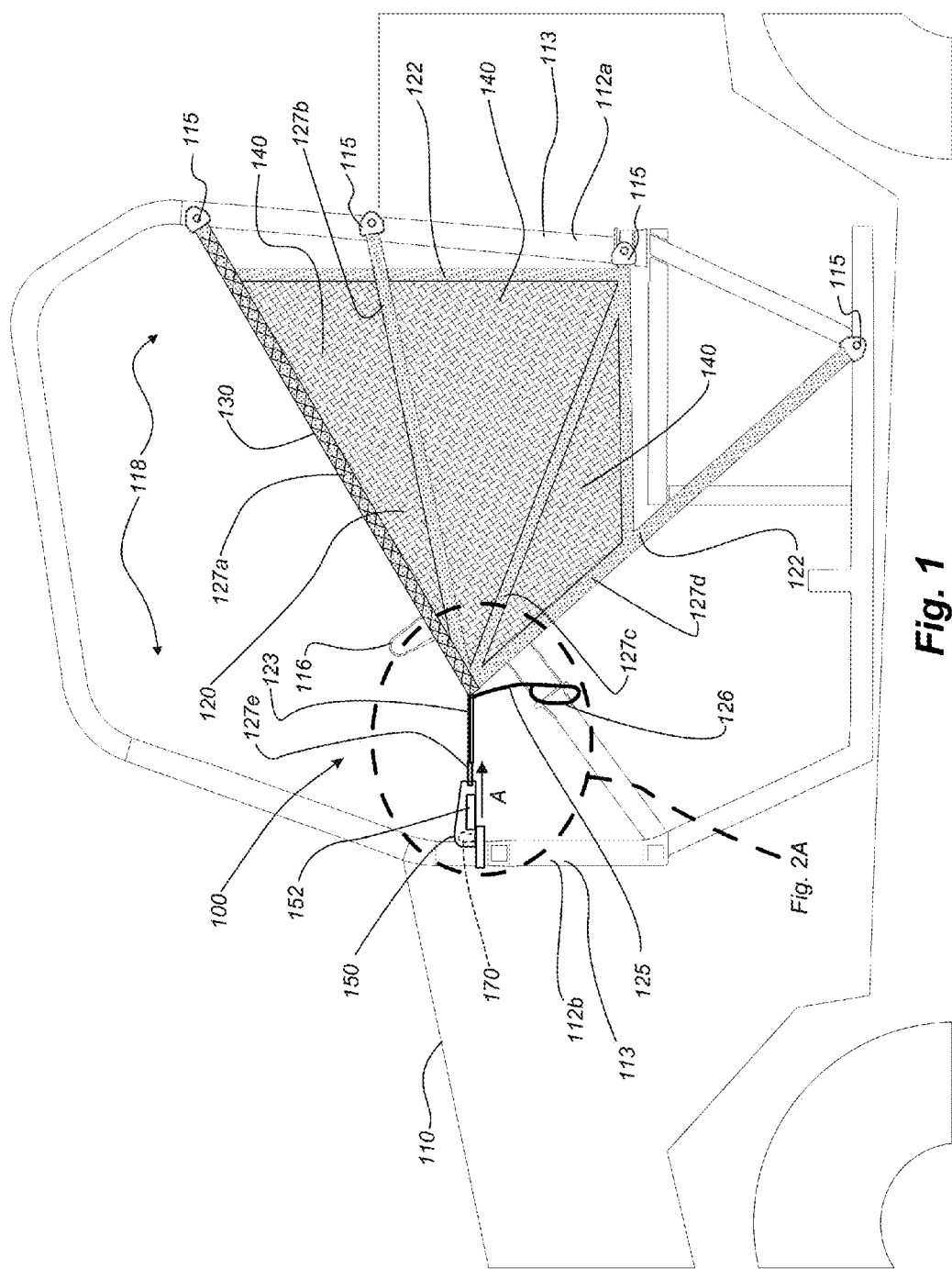

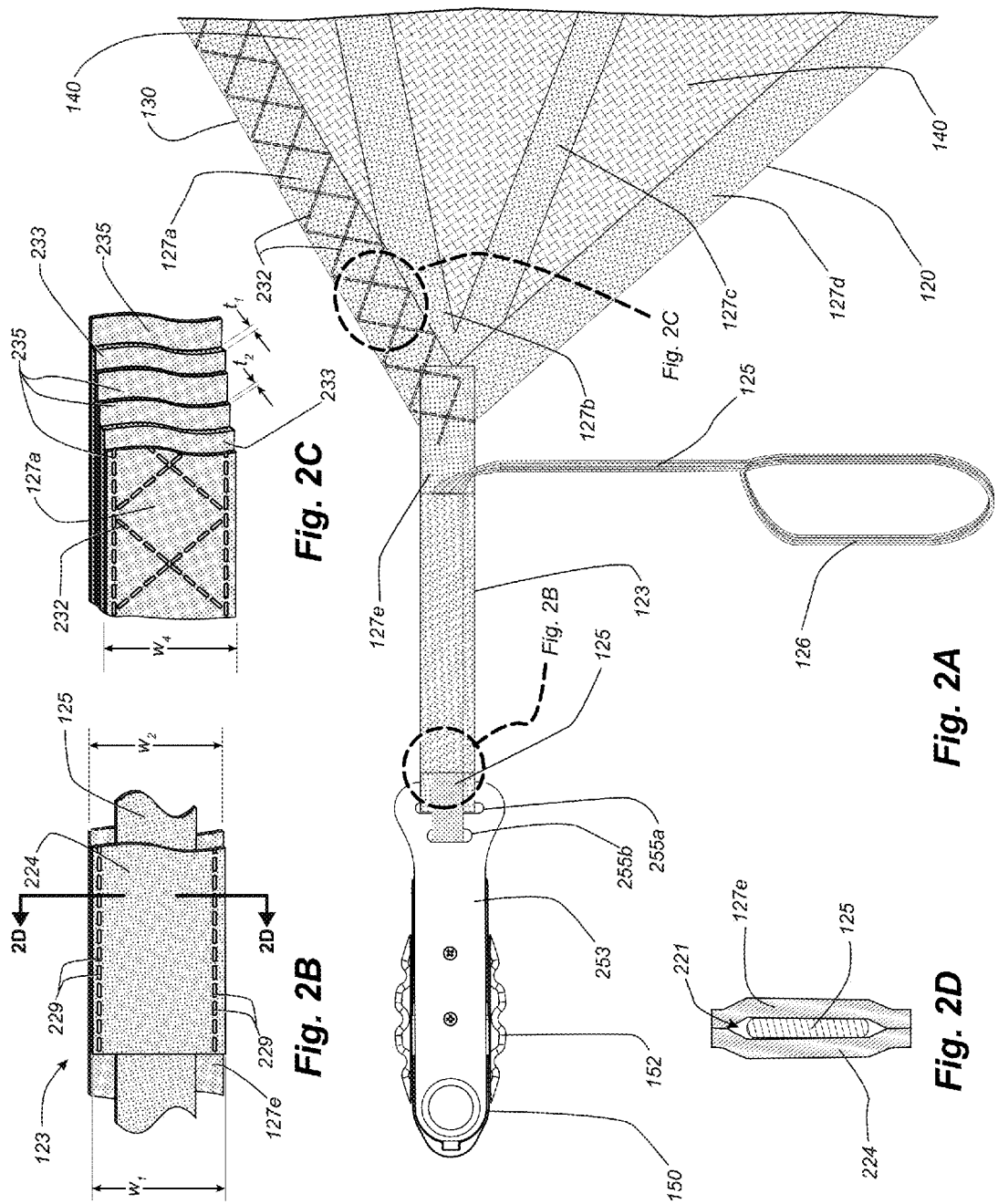

PERSONAL RESTRAINT SYSTEM WITH PULL-CORD RELEASABLE SAFETY NET

CROSS-REFERENCE TO RELATED APPLICATION

The present application claims priority to U.S. Provisional Application No. 61/856,640, filed Jul. 19, 2013, and which is incorporated herein by reference in its entirety.

TECHNICAL FIELD

The present disclosure relates generally to personal restraint systems for use in open-cabin vehicles, and in particular, to restraint systems having a safety net that can be deployed to contain and/or provide protection for occupants in such vehicles.

BACKGROUND

There are many types of restraint systems used in automobiles and other vehicles. One type of restraint system used with open-cabin vehicles includes a safety net configured to cover an open doorway to protect an occupant within the vehicle.

One method of securing the safety net includes attaching a web or belt on one end of the safety net to an anchor (e.g., a metal bar) on the vehicle with a releasable latch. After use, an occupant can release the latch to remove the safety net from the doorway and exit the vehicle. Upon reentering the vehicle, the occupant can reattach the net so that it again covers the opening.

BRIEF DESCRIPTION OF THE DRAWINGS

FIG. 1 is a partially-schematic side view of a vehicle having a personal restraint system configured in accordance with an embodiment of the present technology.

FIG. 2A is an enlarged view of a portion of a safety net configured in accordance with an embodiment of the present technology, FIGS. 2B and 2C are enlarged cut-away views taken from FIG. 2A, and FIG. 2D is a cross-sectional side view taken along line 2D-2D in FIG. 2B.

DETAILED DESCRIPTION

Figure 3A:
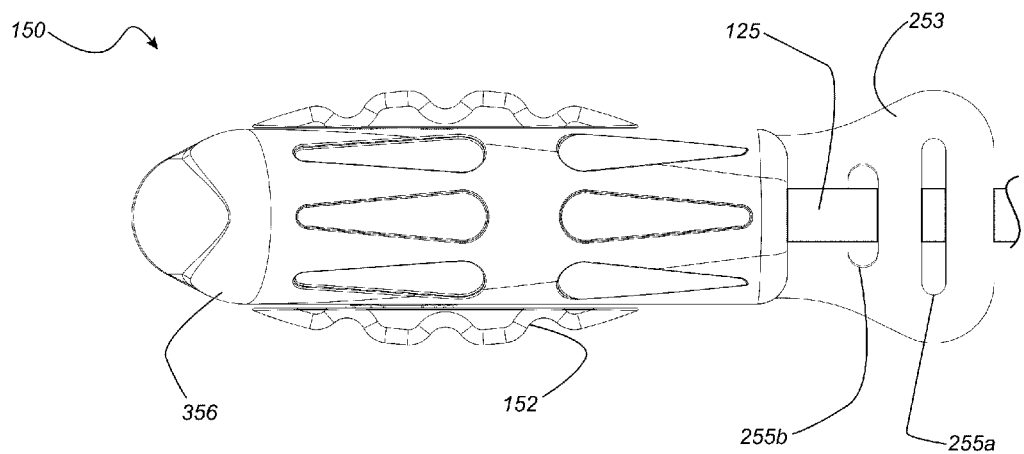
FIGS. 3A and 3B are enlarged top views of a latch device configured in accordance with an embodiment of the present technology.

The following disclosure describes various embodiments of personal restraint systems and devices, and methods of using such systems and devices in a vehicle, such as a utility terrain vehicle (UTV) or an all-terrain vehicle (ATV). Certain details are set forth in the following description and in FIGS. 1-7 to provide a thorough understanding of various embodiments of the disclosure. Other details describing well-known structures and systems often associated with latch systems, safety nets, and related vehicle structures, however, are not set forth below to avoid unnecessarily obscuring the description of the various embodiments of the disclosure.

Many of the details and features shown in the Figures are merely illustrative of particular embodiments of the disclosure. Accordingly, other embodiments can have other details and features without departing from the spirit and scope of the present disclosure. In addition, those of ordinary skill in the art will understand that further embodiments can be practiced without several of the details described below. Furthermore, various embodiments of the disclosure can include structures other than those illustrated in the Figures and are expressly not limited to the structures shown in the Figures. Moreover, the various elements and features illustrated in the Figures may not be drawn to scale.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

FIG. 1 is a partially-schematic side view of a vehicle 110 having a personal restraint system 100 ("restraint system 100") configured in accordance with an embodiment of the present technology. In the illustrated embodiment, the restraint system 100 is described in the context of an open-cabin vehicle. In other embodiments, however, the restraint system 100 can also be used in other types of vehicles (e.g., automobiles, aircraft, rotorcraft, watercraft, etc.). The restraint system 100 includes a safety net 120 extending between a rearward member 112a and a forward member 112b of a vehicle frame 113. More specifically, in the illustrated embodiment, the safety net 120 is attached to the rearward member 112a by brackets 115, and to the forward member 112b by a latch device 150. As discussed in greater detail below, the latch device 150 is releasably coupled to an anchor 170 mounted to the forward member 112b.

The safety net 120 includes webbing 122 and net panels 140 spanning across open sections of the webbing 122. In one embodiment, the net panels 140 can include a woven mesh, such as woven strands of polypropylene, nylon, PTFE, etc. In other embodiments, however, the net panels 140 can include different materials. For example, in some embodiments an individual net panel 140 can include a nylon sheet having openings (e.g., 1 inch diameter circular openings) formed in the nylon sheet. Moreover, although in the illustrated embodiment the webbing 122 carries three panels, in other embodiments, the webbing 122 can be configured to carry additional or fewer panels. In the illustrated embodiment, the webbing 122 includes a plurality of individual web portions, or web straps 127 (identified individually as first through fifth web straps 127a-127e). The first web strap 127a can be disposed toward an upper edge portion 130 of the safety net 120. As described in greater detail below, the first web strap 127a can be stiffer than other portions of the webbing 122 and configured to facilitate operation of the safety net 120 (e.g., deployment and/or stowage of the safety net 120).

In other aspects of this embodiment, the fifth web strap 127e includes a sleeve 123 that slidably carries a portion of a release tether, or pull cord 125. The pull cord 125 can include a first end portion operably coupled to a grip actuator 152 of the latch device 150, and a second end portion formed into a handle portion 126. In use, an operator (not shown; presumably a vehicle occupant) can release the latch device 150 from the anchor 170 by gripping the actuator 152 and moving it rearward in direction A. Alternatively, the operator can release the latch device 150 by pulling the handle portion 126 of the cord 125 in direction A. In one aspect of this embodiment, the handle portion 126 can be conveniently positioned toward a steering wheel 116 of the vehicle 110 for easy access by the operator. This enables the operator to easily reach the handle portion 126 while seated in the vehicle 110 and/or restrained by a seat belt or other harness.

In the deployed configuration shown in FIG. 1, the safety net 120 covers a portion of an occupant opening 118 in the vehicle 110 through which an occupant can enter and exit the vehicle 110. In particular, the safety net 120 covers a region in the occupant opening 118 generally adjacent the occupant's head, torso, arms, and/or upper thighs and legs when the occupant is seated and operating the vehicle 110. In this configuration, the safety net 120 can protect the occupant by preventing the occupant or their appendages from moving outside the vehicle 110 and getting trapped between the vehicle 110 and the ground or other objects. The safety net 120 can also keep foreign objects, such as branches, rocks, and debris from entering the vehicle 110 and striking the occupant. In other embodiments, the safety net 120 can have other configurations. For example, a system of safety nets or other suitable restraint structures can also cover a region in the occupant opening 118 toward the occupant's feet, ankles, shins, and/or knees. Other details related to safety nets and safety net systems are disclosed in, for example, U.S. Provisional Application No. 61/856,640, entitled "Self-stowing Safety Net systems for Use with Vehicles and Associated Apparatuses and Methods," and filed Jul. 19, 2013, which is incorporated by reference herein in its entirety.

FIG. 2A is an enlarged view of a portion of the safety net 120, FIGS. 2B and 2C are enlarged isometric cut-away views taken from FIG. 2A, and FIG. 2D is a cross-sectional side view taken along line 2D-2D in FIG. 2B. Referring first to FIG. 2A, the latch device 150 has been rotated 90 degrees relative to FIG. 1 for ease of illustration. As shown, the fifth web strap 127e has a first end portion fixedly attached to end portions of the web straps 127a-127d, and a second end portion coupled to a frame 253 of the latch device 150. For example, the second end portion of the fifth web strap 127e can be looped through a slot 255a in the frame 253 to secure the fifth web strap 127e to the frame 253.

In one aspect of the embodiment, the pull cord 125 slidably extends through the sleeve 123 and a second slot 255b in the frame 253 before attaching to the actuator 152 of the latch device 150. Referring to FIG. 2B, the sleeve 123 can include a sleeve portion 224 (e.g., a portion of a web strap) that overlays and is attached to the fifth web strap 127e by stitching 229 (e.g., strait stitches) formed toward the edges of the sleeve portion 224 and the fifth web strap 127e. The sleeve portion 224 can have a width $W_1$ of from about 0.5 inch to about 2 inches or more, such as from about 0.75 inch to about 1.5 inch., or about 1 inch. The sleeve portion 224 can also have a material thickness of from about 0.01 inch to about 0.1 inch, such as from about 0.04 inch to about 0.08 inch, or 0.06 inch. In the illustrated embodiment, the first web strap 228a can have a width $W_2$ and a material thickness that are the same or similar to the counterpart dimensions of the sleeve portion 224. In another embodiment, the sleeve portion 224 can have different widths and/or thicknesses than the first web strap 127a.

As best seen in FIG. 2D, the pull cord 125 has a width and a thickness selected so that the pull cord 125 can freely slide in a passage 221 located between the sleeve portion 224 and the fifth web strap 127e. In some embodiments, the sleeve portion 224, the pull cord 125, and the web straps 127a-127e can each be made from a layer of seatbelt webbing, tubular webbing, ribbon webbing, or other suitable webbing materials (e.g., polypropylene, nylon, and/or polyester) known in the art. In other embodiments, the sleeve portion 224, the pull cord 125, and/or one or more of the web straps 127a-127e can be made from different materials of suitable strength, flexibility and/or other functional characteristics. For example, in some embodiments, the pull cord 125 can include a plastic wire or a metal cable, rather than a webbing material.

Returning to FIG. 2A, the first web strap 127a can include stitching 232 (e.g., diamond patterned stitching) and additional layers of web material configured to stiffen the first strap 127a relative to the other web straps 127b-127e. As best seen in FIG. 2C, the first web strap 127a can include two layers of relatively thick web material 233 sandwiched between adjacent layers of relatively thinner web material 235. Each of the web layers 233 can have a thickness $t_1$ that is greater than the individual thickness of the web layers 235. For example, the thickness $t_1$ of the web layers 233 can be at least twice the thickness $t_2$ of the web layers 235. In some embodiments, the web layers 235 can have the same thickness and/or width as the fifth web strap 127e and/or one or more of the web straps 127a-d.

In one embodiment, the first web strap 127a can be formed from flexible web materials (e.g., seatbelt webbing) and without an elongate insert (e.g., a plastic or metal rod) extending between the web layers 233 and 235 to provide stiffness. One advantage of this configuration is that the first web strap 127a can be stiff, but remain relatively resilient when an operator and/or object pushes against the safety net 120 with a large force. In another embodiment, the first web strap 127a can be curved outwardly along its length so that it causes the safety net 120 to bow outwardly (e.g., outwardly from a vertical plane) when it is in the deployed configuration of FIG. 1. For example, the first web strap 127a can be configured such that the safety net 120 bows outwardly by several inches, such as by about 1 to 4 inches or more (e.g., about 3 inches). In one aspect of this embodiment, the outwardly curved safety net 120 can provide additional room for an operator's legs, arms, elbows, and/or hands while operating the vehicle 110. In several embodiments described in greater detail below, the first web strap 127a can also facilitate deployment and storage of the safety net 120. In an additional or alternate embodiment, one or more of the web straps 127b-e can be stiffened in a manner similar to that described above for the first web strap 127a as desired to provide other functional and/or dimensional characteristics.

Figure 3B:
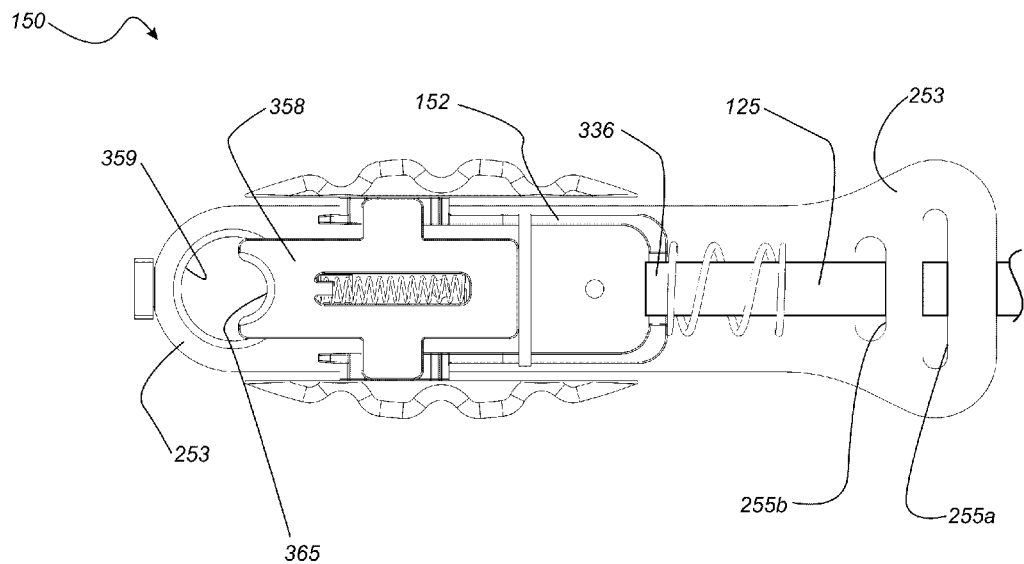

FIGS. 3A and 3B are enlarged top views of the latch device 150. In the illustrated embodiment, the latch device 150 can be at least generally similar in structure and function to one or more of the latch devices described in detail in U.S. patent application Ser. No. 14/172,660, filed Feb. 4, 2014, and titled "Latch Device and Anchor with Swivel Coupling," which is incorporated herein in its entirety by reference. Further, while only certain aspects of the latch device 150 are described herein for purposes of illustration (e.g., latch release aspects), the latch device 150 can have other structural and/or operational features. In other embodiments, the restraint system 100 can include other types of latch devices, actuators, and/or other suitable releasable connectors that can be used in conjunction with or in lieu of the latch device 150.

Referring first to FIG. 3A, the pull cord 125 extends into the latch device 150 through an opening (not shown) in a housing 356. The housing 356 is removed from FIG. 3B for purposes of illustration. As best seen in FIG. 3B, an end portion 336 of the pull cord 125 is fixedly attached to the actuator 152, such as by a knot, loop, fastener, etc. In the illustrated embodiment, the actuator 152 is in sliding contact with the frame 253 and is operably coupled to a first engagement member 358 (e.g., a tongue or plate). The first engagement member 358 includes a collar portion 365 positioned adjacent to an anchor aperture 359 in the frame 253. As described in greater detail below, the collar portion 365 is configured to engage the anchor 170 (FIG. 1) when the anchor 170 is inserted into the anchor aperture 359 to secure the latch device 150 to the anchor 170.

Figure 4A:
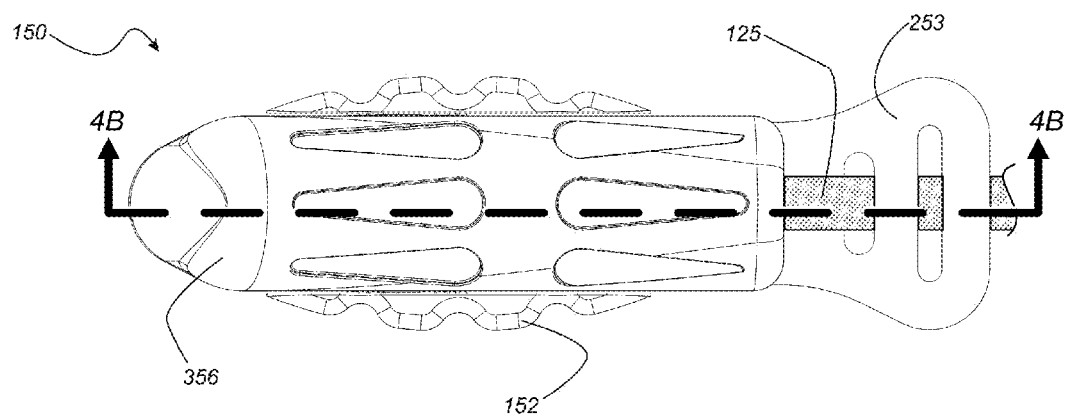
FIG. 4A is an enlarged top view of a latch device in a first stage of operation in accordance with an embodiment of the present technology.
Figure 4B:
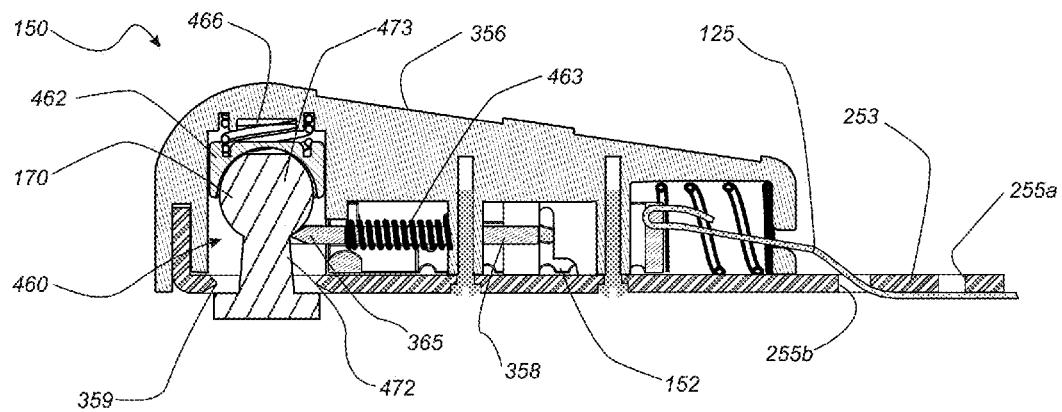
FIG. 4B is a cross-sectional side view of the latch device taken along line 4B-4B in FIG. 4A.

FIG. 4A is an enlarged top view of the latch device 150 showing the latch device 150 in a first stage of operation (i.e., an engaged stage) in accordance with an embodiment of the present technology, and FIG. 4B is a cross-sectional side view of the latch device 150 taken along line 4B-4B in FIG. 4A. Referring to FIGS. 4A and 4B together, the anchor 170 has been inserted into an anchor cavity 460 in the housing 356, and engaged by the collar portion 365 to secure the latch device 150 to the anchor 170. In particular, a first biasing member 463 urges the collar portion 365 against a neck portion 472 of the anchor 170 to prevent removal of the anchor 170 from the anchor aperture 359. In the illustrated embodiment, the latch device 150 can include a second biasing member 466 configured to urge a second engagement member 462 (e.g., a plastic or metal cap) against a head portion 473 of the anchor 170. The first and second engagement members 358 and 462 can bear against the head portion 473 on adjacent sides to snugly secure the latch device 150 to the anchor 170.

Figure 5A:
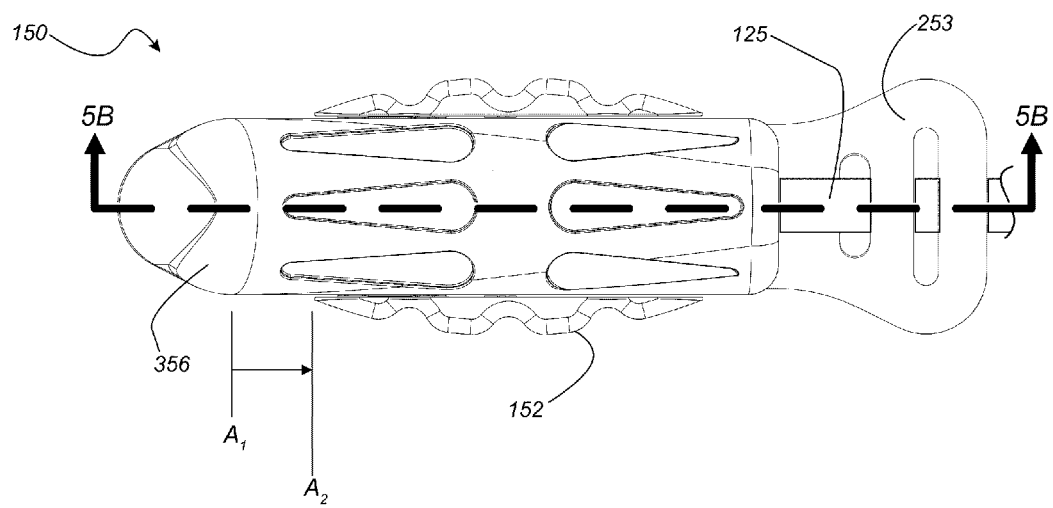
FIG. 5A is an enlarged top view of the latch device of FIG. 4A in a second stage of operation in accordance with an embodiment of the present technology.
Figure 5B:
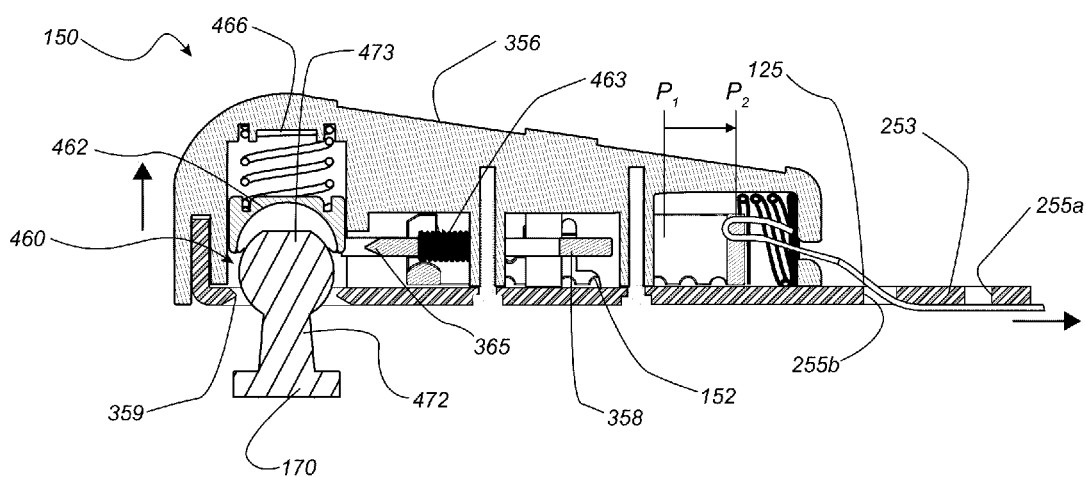
FIG. 5B is a cross-sectional side view of the latch device taken along line 5B-5B in FIG. 5A.

FIG. 5A is an enlarged top view of the latch device 150 in a second stage of operation (e.g., a release stage) in accordance with an embodiment of the present technology, and FIG. 5B is a cross-sectional side view of the latch device 150 taken along line 5B-5B in FIG. 5A. Referring to FIGS. 5A and 5B together, at this stage the operator has pulled the pull cord 125 from position $P_1$ toward position $P_2$ to thereby caused the actuator 152 to move from position $A_1$ and toward position $A_2$ (FIG. 5A). As the actuator 152 moves in this direction, it moves the first engagement member 358 away from the anchor 170. As the collar portion 356 withdraws from the anchor cavity 460 and disengages from, the second engagement member 462 pulses against the anchor 170 to push the latch device 150 off of the anchor 170 (as shown by the arrow in FIG. 5B). In one embodiment, the second engagement member 462 can "eject" the latch device 140 off of the anchor 170 when the second biasing member 462 decompresses.

Figure 6A:
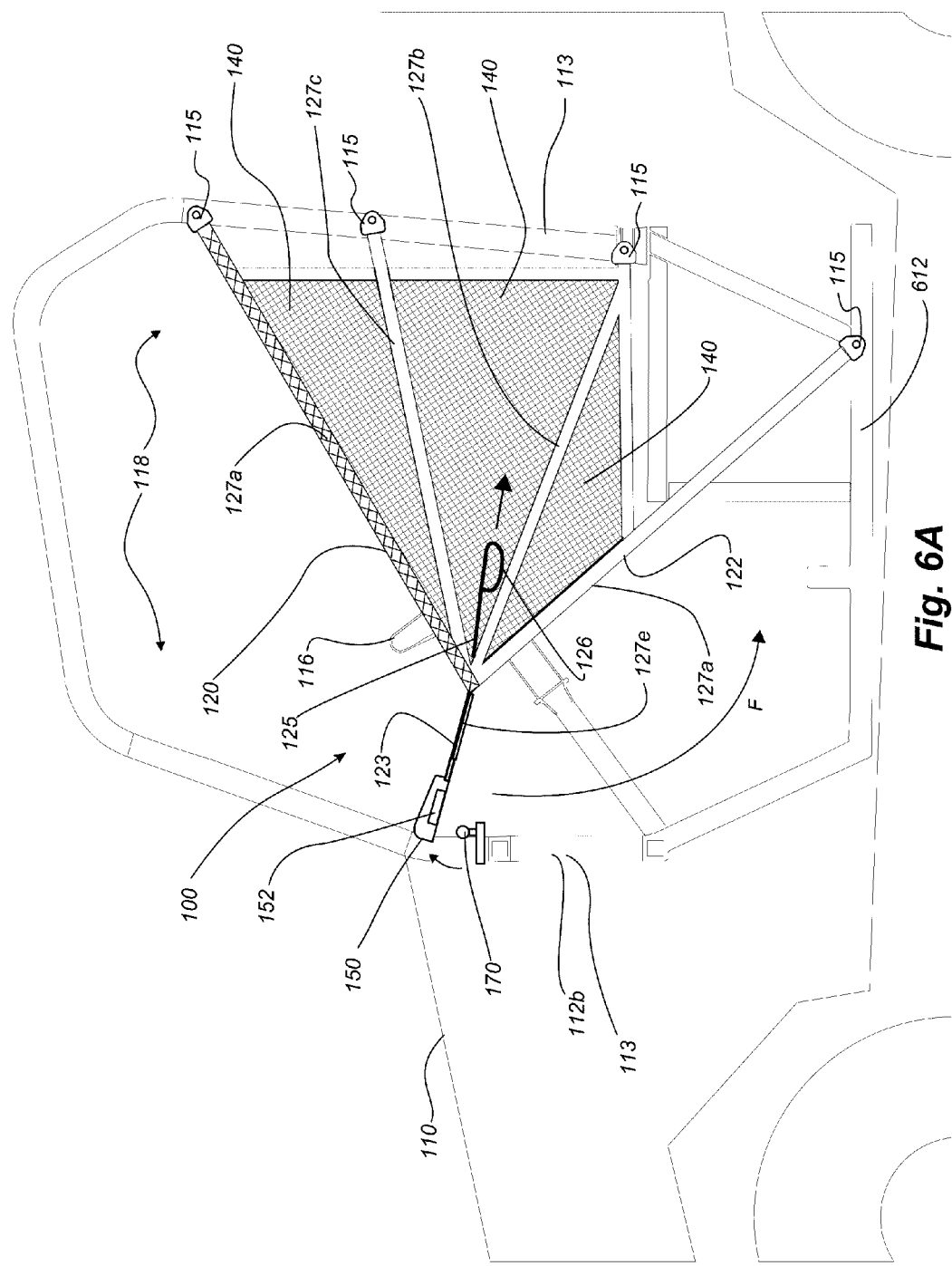
FIGS. 6A and 6B are partially-schematic side views of the personal restraint system of FIG. 1 in various stages of operation in accordance with an embodiment of the present technology.
Figure 6B:
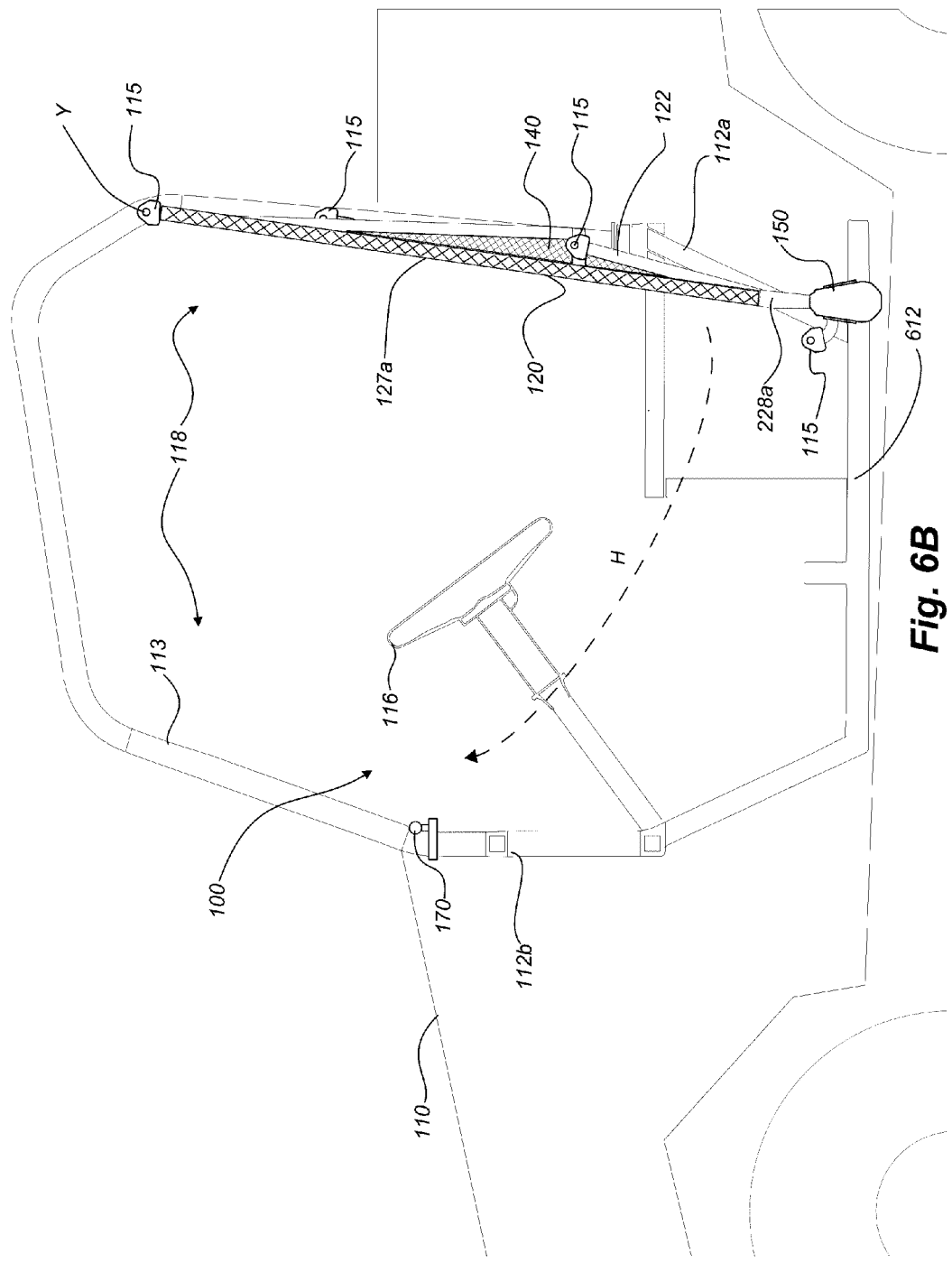

FIGS. 6A and 6B are partially-schematic side views of the safety net 120 in various stages of use in accordance with an embodiment of the present technology. Referring first to FIG. 6A, the operator (not shown) has released the latch device 150 from the anchor 170 by pulling the pull cord 125. In some embodiments, when the latch device 150 is released from the anchor 170, the second engagement member 462 (FIG. 5B) can eject (e.g., pop off) the latch device 150 from the anchor 170, as discussed above. Once the latch device 150 is released, the safety net 120 can fall toward the rearward 112a of the vehicle frame 113 in the direction of arrow F.

Referring to FIG. 6B, the safety net 120 is collapsed or folded upon itself into a stowed configuration. In the illustrated embodiment, the latch device 150 hangs from the rearward member 112a toward a lower member 612 of the vehicle frame 113. In one aspect of this embodiment, the relatively stiffer first web strap 127a can hold the safety net 120 in the stowed configuration and help prevent the safety net 120 from swinging into the occupant opening 118 and/or interfering with vehicle operation. In another aspect of this embodiment, the outer relative stiffness of the web strap 127 can help prevent the safety net 120 from becoming tangled when it is in the stowed configuration. Yet another advantage of the first web strap 127a is that it can facilitate deployment of the safety net 120. For example, to deploy the safety net 120, the operator can grab the first web strap 127a with a single hand and rotate the first web strap 127a (as shown by the arrow H) about a pivot point Y at an upper portion of the rearward member 112a. As the first web strap 127a pivots, the first web strap 127a can help unfold the safety net 120 and tauten the webbing 122 and the net panels 140 between the forward and rearward members 112a-b of the vehicle frame 113.

Figure 7:
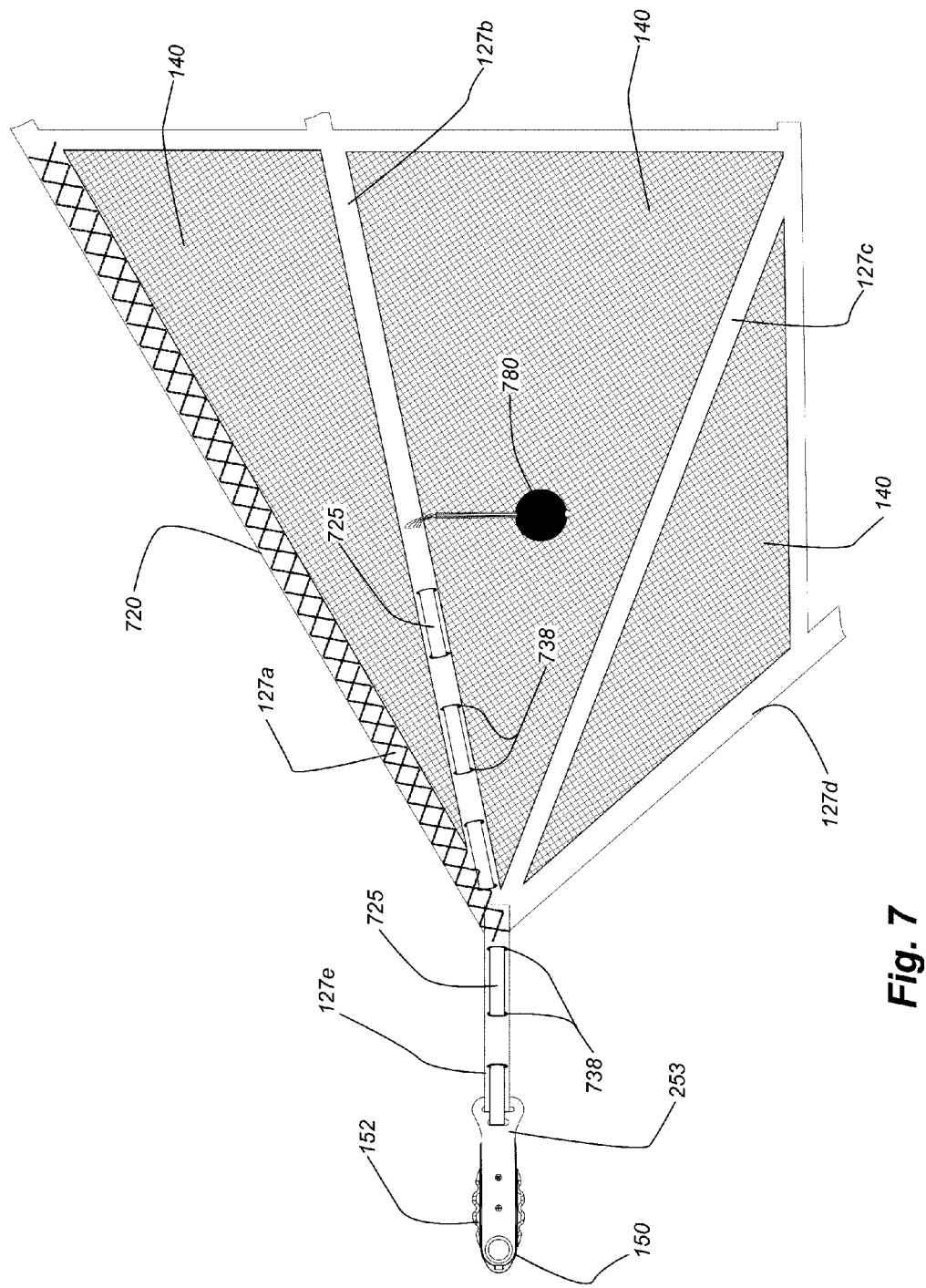
FIG. 7 is a side view of a safety net configured in accordance with another embodiment of the present technology.

FIG. 7 is a partially-schematic side view of a safety net 720 configured in accordance with another embodiment of the present technology. The safety 720 net can include features that are at least generally similar in structure and function to those of the safety net 120 described in detail above with reference to FIGS. 1-6B. For example, the safety net 720 can include a release tether, or pull cord 725, operably coupled to the actuator 152 of the latch device 150 as described above with reference to FIG. 1. In the embodiment of FIG. 7, however, the webbing 122 includes slots 738 (e.g., eyelets) formed through portions of the webbing 122. In particular, the slots 738 are formed through portions of the first web strap 127a and portions of one of the second web strap 127b. In the illustrated embodiment, the pull cord 725 is slidably interleaved through the slots 738 between the latch device 150 and a handle 780 (e.g., a plastic or rubber ball) coupled to an end portion of the pull cord 125. In one aspect of this embodiment, the handle 780 can be positioned toward a medial portion of the safety net 120 that is closer to the rearward 112a side of the vehicle frame 113 relative to the position of the handle 126 shown in FIG. 1.

From the foregoing, it will be appreciated that specific embodiments of the disclosure have been described herein for purposes of illustration, but that various modifications may be made without deviating from the spirit and scope of the various embodiments of the disclosure. For example, the sleeve 123 (FIG. 1) of the safety net 120 can extend beyond the fifth web strap 127e (FIG. 1) and further toward the rearward member 112a of the vehicle frame 113. Further, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A personal restraint system for use with a vehicle having a frame adjacent at least a portion of an open doorway, the personal restraint system comprising:

a safety net configured to attach to a first portion of the frame;

a latch device fixedly attached to the safety net and configured to releasably engage a second portion of the frame, wherein the latch device includes a latch frame, an actuator movably coupled to the latch frame, and an engagement member biasedly coupled to a portion of the latch device and configured to cooperate with the actuator to eject the latch device from the second portion of the frame in response to movement of the actuator from a first actuator position toward a second actuator position; and a pull cord fixedly attached to the actuator and configured to move the actuator away from the first actuator position toward the second actuator position to release the latch device from the second portion of the vehicle frame.

2. The personal restraint system of claim 1 wherein the pull cord is slidably coupled to the safety net.

3. The personal restraint system of claim 1 wherein the safety net includes a sleeve, and wherein at least a portion of the pull cord slidably extends though the sleeve.

4. The personal restraint system of claim 1 wherein the safety net includes:
webbing; and
a sleeve portion formed by the webbing wherein the pull cord slidably extends through the sleeve portion.

5. The personal restraint system of claim 1 wherein the safety net includes webbing having:
a plurality of first web straps; and
a second web strap disposed toward an edge portion of the safety net, wherein the second outer web strap is stiffer than each of the first web straps.

6. The personal restraint system of claim 1 wherein:
the safety net includes a sleeve slidably carrying the pull cord,
the latch device includes a frame having a first aperture and a second aperture;
the safety net is fixedly attached to the frame via the first aperture; and
the pull cord slidably extends through the sleeve and the second aperture.

7. The personal restraint system of claim 1 wherein the second portion of the frame includes an anchor, and wherein the actuator is configured to releasably engage the anchor.

8. The personal restraint system of claim 7 wherein:
the latch device includes a housing having an anchor cavity and a biasing member within the anchor cavity;
the biasing member is compressed between the housing and the engagement member; and
the actuator is configured to releasably engage the anchor when the anchor is inserted into the anchor activity.

9. The personal restraint system of claim 7 wherein the anchor has a head portion, and wherein the engagement member has a recess configured to receive the head portion.

10. A personal restraint system for use with a vehicle having a frame adjacent at least a portion of an open doorway, the personal restraint system comprising:
a safety net configured to attach to a first portion of the frame;
a latch device fixedly attached to the safety net and configured to releasably engage an anchor mounted to a second portion of the frame, wherein the latch device includes
a latch frame having an anchor aperture,
an actuator slidably mounted to the latch frame,
a housing attached to the latch frame, and
an engagement member moveably coupled to the housing, wherein the engagement member is configured to
interact with the anchor when the anchor is inserted through the anchor aperture, and
cooperate with the actuator to eject the latch device from the anchor in response to movement of the actuator from a first actuator position toward a second actuator position; and
a pull cord operably coupled to the latch device, wherein the pull cord is fixedly attached to the actuator and configured to move the actuator away from the first actuator position and toward the second actuator position to release the latch device from the second portion of the frame.

11. The personal restraint system of claim 10 wherein:
the engagement member is a first engagement member; and
the latch device further includes a second engagement member operably coupled to the actuator and configured to prevent the removal of the latch device from the anchor when the actuator is at the first actuator position.

12. A flexible door cover for use with a vehicle, the door cover comprising:
a safety net including a webbing;
a latch device fixedly attached to a portion of the webbing and configured to releasably couple the webbing to an anchor mounted to a portion of the vehicle adjacent to an operator seating position, wherein the latch device includes
an actuator, and
an engagement member configured to cooperate with the actuator to eject the latch device from the anchor; and
a release tether slidably carried by the webbing, wherein, a first end portion of the release tether is operably coupled to the actuator and a second end portion is disposed within reach of an operator seated in the seating position to facilitate operator access to the second end portion, wherein pulling on the second end portion by the operator releases and ejects the latch device from the anchor, allowing the door cover to fall away from the portion of the vehicle.

13. The door cover of claim 12, further comprising a sleeve attached to the webbing, wherein the release tether is configured to slidably extend through the sleeve.

14. The door cover of claim 12 wherein the webbing includes:
a first web strap fixedly attached to the latch device; and
a second web strap attached to the first web strap and configured to define a sleeve that slidably carries the release tether.

15. The door cover of claim 12 wherein:
the webbing includes a strap having plurality of slots extending partially therethrough; and
the release tether is slidably interleaved through the slots.

16. The door cover of claim/wherein the vehicle includes a frame around a door opening, wherein the latch device is configured to releasably couple the webbing to a first portion of the frame, and wherein the webbing includes:
a first web strap portion fixedly attached to the latch device; and
a second web strap portion coupled between the first web strap portion and a second portion of the frame, wherein the second web strap portion includes a plurality of layers of web material configured to stiffen the second web strap portion.

17. The door cover of claim 16 wherein the webbing further includes a plurality of third web strap portions coupled between the first web strap portion and third portions of the frame of the vehicle, wherein the second web strap is thicker than each of the third web straps.

18. The door cover of claim 12 wherein the end portion of the release tether is formed into the shape of a handle.

19. The door cover of claim 12, further comprising a handle coupled to the end portion of the release tether and disposed toward the operator seating position.

20. The door cover of claim 12 wherein the second end portion of the tether is disposed toward a medial portion of the safety net.

21. The flexible door cover of claim 12 wherein:
the latch device further includes a frame having an anchor aperture;
the actuator is operably mounted to the frame; and
the actuator and the engagement member are configured to bear against the anchor when the anchor is inserted into the anchor aperture.

22. The flexible door cover of claim 12 wherein the latch device further includes a housing and a biasing member, and wherein the biasing member is operably disposed between the engagement member and the housing to drive the engagement member against the anchor and eject the latch device from the anchor in response to movement of the actuator.

23. A personal restraint system for use with an open-cabin vehicle having a frame adjacent an operator seating portion of the vehicle, the personal restraint system comprising:
a safety net including first and second flexible web straps;
means for releasably coupling the safety net to a portion of the frame, wherein the means for releasably coupling is fixedly attached to at least one of the first and second web straps;
an actuator cord operably coupled to the means for releasably coupling; and
means for slidably coupling the actuator cord to the safety net, wherein the first web strap is stiffer than the second web strap and configured such that the safety net folds into a stowed configuration when the means for releasably coupling is released from the portion of the frame.

24. The personal restrain system of claim 23 wherein the means for slidably coupling the actuator cord to the safety net include a sleeve.

25. A personal restraint system for use with a vehicle having a frame adjacent an occupant opening, the personal restraint system comprising:
a safety net configured to attach to a first portion of the frame, wherein the safety net includes first and second flexible web straps, and wherein the first web strap is stiffer than the second web strap;
a latch device attached to at least one of the first and second web straps, wherein the latch device is configured to releasably engage a second portion of the frame; and
a pull cord operably coupled to the latch device, wherein movement of the pull cord away from the latch device releases the latch device from the second portion of the frame, and wherein the first web strap is configured to cause the safety net to fold upon itself into a stowed configuration when the latch device is released from the second portion of the frame.

26. The personal restraint system of claim 25 wherein:
each of the first and second web straps includes
a first end portion attached to the first end portion of the other, and
a second end portion configured to attach to the first portion of the frame;
the safety net includes a panel spanning an opening between the first and second web straps; and
the first web strap is configured to tauten the webbing between the first and second web straps when the safety net is unfolded from the stowed configuration and the latch device is engaged with the second portion of the frame.

27. The personal restraint system of claim 25 wherein the first web strap forms an outer edge portion of the safety net.

28. The personal restraint system of claim 27 wherein the first web strap is formed from a plurality of web layers and without an elongate insert extending between any of the web layers.

29. The personal restraint system of claim 25 wherein:
the first and second web straps form a portion of a webbing of the safety net; and
the pull cord is carried by the webbing, wherein a first end portion of the pull cord is operably coupled to the latch device and a second end portion of the pull cord is disposed within reach of an operator seated in an operator seating position within the vehicle.

* * * * *